United States Patent [19]

Heine et al.

[11] Patent Number: 4,963,384
[45] Date of Patent: Oct. 16, 1990

[54] PROCESS FOR PRODUCING BIFIDOGENIC INFANT AND DIETETIC FOODS REDUCED IN ANTIGENICITY

[75] Inventors: Willi Heine; Klaus-Dieter Wutzke, both of Rostock, German Democratic Rep.

[73] Assignee: Milupa Aktiengesellschaft, Friedrichsdorf, Fed. Rep. of Germany

[21] Appl. No.: 243,804

[22] Filed: Sep. 13, 1988

[30] Foreign Application Priority Data

Sep. 14, 1987 [DD] German Democratic Rep. .................................. 23306942

[51] Int. Cl.$^5$ ............................................... A23C 9/20
[52] U.S. Cl. ............................. 426/580; 426/582/801
[58] Field of Search ......................... 426/580, 582, 801

[56] References Cited

U.S. PATENT DOCUMENTS 2,872,382  2/1959  Keck et al. ........................... 426/801
4,042,575  8/1977  Eustache .............................. 426/583

FOREIGN PATENT DOCUMENTS 1123647  6/1967  United Kingdom .

Primary Examiner—Donald E. Czaja
Assistant Examiner—Helen Pratt
Attorney, Agent, or Firm—Scully, Scott, Murphy & Presser

[57] ABSTRACT

The present invention relates a process for the production of liquid and powdered bifidogenic infant and dietetic foods that are reduced in their antigenicity. The process, according to the invention, is characterized by the cleavage, but not removal, of sialic acid from milk protein and/or milk protein degradation products, via acid hydrolysis, in order to achieve a bifidogenic product. Thus, it is possible to produce bifidogenic infant foods, particularly suitable for infants, premature and undersized babies, and those parties who cannot tolerate usual milk products. In addition, the process can be used to produce dietetic food, particularly for persons suffering from intestinal allergies, other allergic diseases and failure of the liver and kidney.

10 Claims, No Drawings

PROCESS FOR PRODUCING BIFIDOGENIC INFANT AND DIETETIC FOODS REDUCED IN ANTIGENICITY

The present invention relates to a process for the production of infant and dietetic foods, which are bifidogenic and reduced in antigenicity.

Worldwide mother's milk is considered the optimal nutrition for infants. However, for many reasons mother's milk is not always available for feeding newborns and infants. Since a long time period for that reason milk of mammals, especially cow's milk, has been used for infant foods. Non-modified or fat-reduced cow's milk, i.e. skimmed milk, however is suitable for feeding infants not before the fourth to sixth month. When cow's milk is used as substitute for mother's milk, it is necessary to perform the so-called adaptation. This includes, inter alia, a partial substitution of the milk fat by vegetable oils. For improving the nutritional value of the protein and for obtaining a higher content of certain essential amino acids, similar to human milk, it is necessary to change the content of cow's milk protein. In principle, for the production of infant foods based on cow's milk it is intended to adapt these products as closely as possible to human milk.

In many publications the production of infant foods based on cow's milk is described. The state of art offers the possibility of obtaining a product considerably corresponding to mother's milk by removing certain parts of the cow's milk and by adding components similar to mother's milk.

The production of foods with improved protein digestibility and reduced antigenicity has a particular important use for medical purposes beside the application in infant nutrition. This relates to foods particular for patients with intestinal allergies, other allergic diseases (e.g. eczema, urticaria, inter alia), for patients with insufficiency of kidney and liver and for patients with gastro-intestinal disorders.

On the market all infant and dietetic foods based on proteins are characterized by the intact specific antigenicity of the protein component. The acidolytic digestion of dietary proteins leads to a nearly complete loss of the antigenicity, but the oligopeptide- or elemental diets produced by this technique result in a drastic deterioration in taste, which causes almost generally a refusal of those foods by the patients. The antigenicity of dietary proteins still leaves an unresolved problem in the adaptation to mother's milk of infant foods based on cow's milk or soy proteins and in the production of easily digestible diets for medical purposes.

All well known infant foods based on cow's milk used as substitute for mother's milk have the disadvantage of being non-bifidogenic. Bifidogenic factors subsume, inter alia, oligosaccharides containing, inter alia, N-acetyl-D-glucosamine, N-acetylgalactosamine, L-fucose, lactose, D-glucose and D-galactose. These are growth factors for Lactobacillus bifidus which manifest dominantly in the intestinal flora of breast-fed infants. The absence of bifidogenicity in all known substitutes for mother's milk based on milk of mammals, especially cow's milk, was previously accepted, because no possibility was realized for adding such a bifidogenic factor to human milk substitutes or to develop this in these substitutes. The present invention is therefore based on the consideration that by splitting off sialic acid, the bifidogenic oligosaccharides of the residual protein will be accessible to the bifidus bacteria acting as growth factors.

It is known that the antigenicity of nutritional proteins can be reduced by heat treatment. However, protein components expressing high antigenicity demonstrate generally a high heat stability Thus from cow's milk proteins $\beta$-lactoglobulin, casein and $\alpha$-lactalbumin still show antigenic activity even after heat treatment and only the bovine immunoglobulins and bovine serum albumine, both occuring in small concentrations, lose completely or partially their antigenicity by heat treatment. A disadvantage of long-term heating, especially in the presence of reducing substances like lactose, comes from the formation of Maillard products and thereby the biological value of the proteins is decreased.

In vitro and in vivo investigations surprisingly have shown that the specific antigenicity of cow's milk proteins can be destroyed extensively by digestion with pepsin within 30 to 60 minutes. This process is pH-dependent and is carried out optimally at pH 2, delayed at pH 3, and above pH 4 there is practically no reaction. The digestion with trypsin at pH 8 does not lead to any loss of specific antigenicity. Due to the normal process of digestion in the stomach, the transportation into the intestine of antigenic milk proteins, that adhere to the mucosa and permeate the mucosal barrier, is prevented. Increased pH values in the stomach, occuring physiologically in young infants and frequently in allergic diathesis, lead to an increased antigen challenge of the organism caused by foreign proteins and may initiate allergic deseases such as cow's milk protein intolerance.

Therefore, the present invention is based on the consideration that the digestion in the stomach leading to a loss of the antigenic specificity of foreign proteins can be preprocessed in the production of infant foods based on milk or milk products.

The invention relates to a process for the production of bifidogenic infant foods, in which milk, milk components or milk products of mammals are adapted extensively to human milk with respect to the composition by the known means, and characterized in that for obtaining bifidogenicity, sialic acid is cleaved from the milk proteins and their digestion products and said sialic acid is retained in the final mammalian milk material product.

In the same way dietetic foods with reduced antigenicity and bifidogenic effect can be produced, based on the same considerations as for the infant foods mentioned above.

The present invention does not relate to the commonly known adaptation to human milk, of milk, milk components or milk products from mammals. This is presumed as generally known. On the contrary, it is the nature of the invention that sialic acid is cleaved from milk proteins and their digestion products.

Sialic acid is also known as N-acetyl neuraminic acid. According to the present invention sialic acid is cleaved from its bond to the residual protein.

With the term milk of mammals in particular cow's milk is implied subsequently. In certain cases milk of other mammals i.e. of goats, sheep or mares may be taken into consideration.

In the intention of the present invention "milk" is used for full-cream milk and skimmed milk; milk components subsume dietary proteins gained or gainable from milk, especially casein, caseinates, whey proteins (also demineralized), milk protein fractions, proteins from skimmed and for full-cream milk as well as milk products e.g. quarg.

According to the invention sialic acid is split off by heating the milk or the milk products with hydrochloric acid or with a mixture of hydrochloric and phosphoric acid, optionally with the additional use of citric acid in a pH range from 1 to 3 under those conditions of pressure and temperature at which sialic acid is hydrolytically cleaved from the milk protein. The temperatures for the acidolysis are generally in the range of 40° to 90° C. and the pressure is generally ranging between normal pressure and 5 bar. The time for the acidolysis is generally 1 to 24 hours. It is understood that, in particular for the temperature and for the time of the hydrolysis conditions are selected that no disadvantageous alteration of the milk proteins, leading to the formation of Maillard products, can occur.

At higher temperatures the hydrolysis is running in a shorter period than at lower temperatures. In selecting a suitable pressure between normal pressure and 5 bar, also the time and temperature of the hydrolysis can be controlled. At a higher pressure, a lower temperature can be selected. When operating under pressure, a suitable pressure resistent apparatus must be used, whereby in certain cases the costs may be increased. Therefore, it is practical to operate at normal or slightly increased pressure.

When sialic acid is splitt off by a process using hydrochloric acid or a mixture of hydrochloric acid, phosphoric acid and optionally with citric acid i.e., nonenzymatic means, a subsequent neutralization is necessary. This neutralization is performed with inorganic basic compounds of sodium, potassium or calcium, e.g. with KOH, NaOH, Na$_2$CO$_3$, K$_2$CO$_3$ and/or Ca(OH)$_2$. The selection of the neutralization agent also depends on the mineral concentration required for the final product. By using these bases, the residual protein, which is formed during acidolysis, can be adjusted to the required concentration of cations in the complete food.

After splitting off the sialic acid it is of proper use to heat the product for a short term to a temperature from 80° to 100° C. to reduce further the specific antigenicity of the milk protein. This stage, however, may be a typical process step used in the preparation of infant and dietetic foods based on milk, milk components or milk products (adaptation), e.g. sterilization or pasteurization.

A suitable process for the acidolytic detachment of sialic acid is given below.

The process using acidolysis can be performed by the following stages:
(a) addition of hydrochloric acid, phosphoric acid and optionally citric acid to the milk or milk product, until the pH corresponds to the range of 1 to 3,
(b) heating of the under (a) said mixture to 40° to 90° C. at a pressure between normal pressure and 5 bar and treatment under these conditions for a sufficient time to split off the sialic acid from the milk proteins,
(c) neutralizing of the under (b) said product with KOH, Na$_2$CO$_3$, K$_2$CO$_3$ and Ca(OH))$_2$ with the formation of the required mineral concentration,
(d) optionally short-term heating to 80° to 100° C.,
(e) addition of the common components used for the adaptation of milk originated from the groups: fats, carbohydrates, minerals, trace elements and vitamins, and
(f) conventional technical dairy processing of the product obtained as said under (a) and spray drying of the bifidogenic infant and dietetic foods;

stage (d) may be omitted, if, before spray drying, heating steps are performed between 80° to 100° C.

In the technical implementation of the process it is practical and usual either before or after the single process stages to perform a homogenization of the mixture in suitable homogenizing machines. This is oriented on the respective technical conditions. In principle the process according to the invention can be integrated in the commonly used equipment for the production of infant or dielectric foods based on milk or milk products without large additional investment.

The process in accordance with the invention makes possible the production of bifidogenic infant and dietetic foods. To establish a bifidogenic effect it is necessary to add lactose and/or other suitable carbohydrates (e.g. maltose). Beside establishing the bifidogenic property, the antigenicity is also reduced. The residual protein acts as lectin inhibitor and therefore is effective as bifidus growth factor, because bifidogenic oligosaccharides become more accessible for Lactobacillus bifidus.

Infant foods produced with the said process establish a bifidus flora such as in infants fed mother's milk. In first clinical trials with newborns and infants it could be demonstrated that after feeding such food, a typical bifidus flora was detectable in the faeces. Due to the development of this bifidus flora in the intestine of the infants, a protection against infection could be established during the first months of life, as it is the case for breast-fed infants. Infant and dietetic foods produced in accordance with the said process have improved digestibility and tolerance which could also be demonstrated in clinical trials. The application of a food developed in accordance with the said process in some cases of cow's milk protein intolerance exhibited a good acceptance and thus indicate a reduced antigenicity of these foods.

The invention will be further illustrated in the Examples which follow.

EXAMPLE 1

64.17 kg demineralized concentrated whey protein with 80% protein in the dry matters (62.91 kg dry solids) are dissolved in 1459 kg skimmed milk (131.3 kg dry solids) and heated to 50° C. 444 kg of 0.18-N hydrochloric acid are added and the mixture is incubated for 6–8 hours. After 6 hours, the concentration of free sialic acid is determined in the hydrolysis tank.

Afterwards the batch is adjusted to a pH of 6.5–6.9 using 4.64 kg potassium hydroxide. The mixture is heated to 60° C. After reaching the temperature, 504.3 kg lactose (489.62 kg dry solids), 14 kg minerals, 6.9 kg emulsifiers and 285.5 kg of a vegetable fat blend are added.

The complete batch is heated to 65°–70° C., homogenized at 200 bar and at a temperature of about 65° C. in a homogenizer. The homogenized mixture is stored in an intermediate tank and afterwards evaporated to approximately 45–50% of dry solids, e.g. with a 3-stage-falling-film-evaporator. The evaporated concentrate is collected in an intermediate tank. Under stirring, the required amounts of trace elements and 3.1 kg Vitamin mix are added. The mixture is homogenized again at 100 bar. After finishing the homogenization process the mixture is pasteurized for 30 seconds at 85° C. The pasteurized product is dried by spray drying. The powdered product obtained after the spray drying process is subsequently processed and packaged as usual. The calculated batch size of example 1 provides 1 ton of powdered product. An infant food, produced by the described process is particulary suitable for nutrition of newborn infants for the use as a breastmilk substitute. This infant food is suitable for nutrition of infants who cannot tolerate cow's milk or industrial produced infant foods based on cow's milk. Those infants develop no intolerances.

EXAMPLE 2

79.76 kg demineralised concentrated whey protein with 80% protein in the dry matters (62.91 kg dry solids) are dispersed in 300 l of 0.18-N hydrochloric acid at 50° C. and incubated for 6–8 hours. Separately, 46.25 kg acid casein (44.9 kg dry solids) are dissolved in 145 l of 0.18-N hydrochloric acid at 80° C. and incubated for 1–2 hours. After 6 hours, the concentration of free sialic acid is determined in the whey proteins. The hydrolyzed solution of casein is cooled to 50° C., and afterwards both milk protein preparations are mixed. The milk protein blend is adjusted to a pH of 6.5–6.8 using 4.64 kg potassium hydroxide.

To the mixture, 700 l water are added and the batch is heated to 60° C. Thereafter, 6.0 kg of an emulsifier, 283 kg vegetable fat blend, 0.5 kg taurine, 560 kg lactose, and 13.95 kg of an mineral mix are added successively. The batch is heated to 65°–70° C. and then homogenized at 200 bar and at 65° C. Afterwards, the homogenized mixture is stored in an intermediate tank, and the trace elements are added. The complete batch is subsequently homogenized at 100 bar and pasteurized at 85° C. The pasteurized mixture is spray dried. The powdered product obtained after the spray drying process is subsequently processed and pakkaged as usual. The calculated batch size of example 2 provides 1 ton of powdered product.

The infant food, produced by the described process is again suitable for nutrition of newborn infants, and prematures, in the same way as the product of example 1.

EXAMPLE 3

Production of an adapted infant formula based on a whey protein/casein ratio (60:40) and 1.2% protein (batch size 50 l).

1220 g skimmed quarg (protein concentration approximately 20%, corresponding to 240 g casein), produced by Streptococcus lactis- and cremoris starter cultures with additional renilase, and 468 g demineralized whey protein (Ultralac 80) are mixed; afterwards, about 4 l of 0.18-N hydrochloric acid are added to adjust to a pH of 1.5–2.0. The acidified milk-protein blend is heated to 80° C. for 1 hour. Afterwards, the mixture is cooled and neutralized to a pH of 6.6–6.9, using a mixture of 26.24 g Ca(OH)$_2$, 8.88 g NaOH, and 26.6 g KOH. After the addition of 2.77 g magnesium carbonate 7.03 g KH$_2$PO$_4$, and 4.63 g NaH$_2$PO$_4$ to the batch are added 725 g butter, 1.170 kg cottonseed oil, 62500 IU retinol palmitate, 12500 IU ergocalciferol, 25 mg α-tocopherole acetate, 1250 mg ascorbic acid, 25 mg thiamine hydrochloride, 37.5 mg riboflavin, 37.5 mg pyridoxine hydrochloride, 250 mg nicotine amide, 125 mg D-panthenole, and 3.454 g lactose. After mixing of all components the complete batch is homogenized and spray dried as usual.

The ready to feed milk is prepared by dissolving 140 g powder in 900 ml water.

| Electrolytes: | |
|---|---|
| Na | 148 mg/l |
| K | 482 mg/l |
| Ca | 340 mg/l |
| Mg | 30 mg/l |
| P | 140 mg/l |

EXAMPLE 4

Production of an adapted infant food based on whey protein/casein ratio (60:40) and 1.2% protein (batch size 50 l).

According to example 3, 1220 g skimmed quarg (protein concentration about 20%, corresponding to 240 g casein), 468 g Ultralac 80 (corresponding to 355 g whey proteins), 11.5 g phosphoric acid, and about 4 l of 0.18-N hydrochloric acid are mixed, resulting in a pH of 1.5–2.0. Afterwards, the mixture is heated to 80° C. for 1 hour. Neutralization is performed by rapid addition of a mixture, prepared of 21.25 g Ca(OH)$_2$, 11.23 g NaOH, and 30.88 g KOH, until neutralization is achieved. The required final concentration of anions and cations in the product is adjusted, adding the corresponding amounts of Na-, K-, Ca-, and Mg-salts.

Afterwards, subsequently 2.77 g magnesium carbonate, 725 g butter fat, 1.170 kg cottonseed oil, 62500 IU retinol palmitate, 12500 IU ergocalciferol, 25 mg α-tocopherol acetate, 1250 mg ascorbic acid, 25 mg thiamine hydrochloride, 37.5 mg riboflavin, 37.5 mg pyridoxin hydrochloride, 250 mg nicotine amide, 125 mg D-panthenol, and 3454 g lactose are added. After mixing of all components the complete batch is homogenized and spray dried as usual. For stabilization of the emulsion up to 750 g of precooked or gelatinized starch alternatively can be used. The ready to feed milk is prepared by dissolving 140 g powder in 900 ml water.

EXAMPLE 5

Production of a dietetic product for patients with insufficiency of kidneys based on 1.0% protein, low content of potassium and phosphate (batch size 50 l). According to example 4, 1100 g skimmed quarg (protein concentration about 20%, corresponding to 216 g casein), 392 g whey protein (optionally a corresponding amount of lactalbumin), and about 4 l of 0.18-N hydrochloric acid are mixed and heated to 80° C. at a pH 1.5–2.0 for 1 hour. For neutralization, a blend prepared of 17.7 g calcium lactate, 21.25 g Ca (OH)$_2$, 23.7 g KOH, and 20.1 g NaOH is used. Afterwards, subsequently 5.1 g NaH$_2$PO$_4$, 2.77 g magnesium carbonate, 725 g butter fat, 1170 g cottonseed oil, 62500 IU retinol palmitate, 12500 IU ergocalciferol, 25 mg α-tocopherol acetate, 1250 mg ascoribc acid, 25 mg thiamine hydrochloride, 250 mg nicotine amide, 125 mg D-panthenol, and 3454 g lactose are added. After mixing all components the complete batch is homogenized and spray dried as usual.

Preparation:
Dissolve 140 g powder in 900 ml water.

| Electrolytes: | |
|---|---|
| Na | 277 mg/l |
| K | 482 mg/l |
| Ca | 340 mg/l |
| Mg | 30 mg/l |

-continued

| Electrolytes: | |
|---|---|
| P | 140 mg/l |

EXAMPLE 6

Production of a dietetic food for patients with gastrointestinal disorders

| Composition: | |
|---|---|
| acid casein | 33.80 kg |
| demineralized whey protein concentrate (75% protein in dry solids) | 55.90 kg |
| butter fat | 107.10 kg |
| corn oil | 164.30 kg |
| emulsifiers | 6.00 kg |
| starch | 71.50 kg |
| lactose | 512.52 kg |
| vitamin mix | 3.00 kg |
| mineral mix | 30.00 kg |
| calcium carbonate | 4.65 kg |
| potassium hydroxide | 3.38 kg |
| sodium hydroxide | 2.87 kg |
| sodium hydrogen phosphate | 0.73 kg |
| magnesium hydroxide carbonate | 0.50 kg |
| hydrochloric acid (anhydrous, corresponding to 10.135 kg of 37% HCl) | 3.75 kg |
| | 1000.00 kg |

55.9 kg demineralized whey protein concentrate (75% protein) and 33.8 kg acid casein are dispersed in 571 l of 0.18-N hydrochloric acid. The solution is heated to 80° C. for 1-2 hours, agitating intensively. The pH of the solution is adjusted to 1.5-2.0. After hydrolysis, the batch is cooled to 50° C. and adjusted to pH 6.5-6.8, using potassium hydroxide, sodium hydroxide, sodium hydrogen phosphate, magnesium hydroxide carbonate, and calcium carbonate. Then 430 l of water are added and the batch is heated to about 70° C. Afterwards, 512.52 kg lactose and 71.5 kg starch are added successively; both components are dispersed homogeneously.

In a separate tank, 107.1 kg butter fat and 164.3 kg corn oil are mixed and heated to 70° C. 6 kg emulsifier are dissolved in the fat blend. The mixture of fat and emulsifier is added to the batch, agitating intensively for at least 20 minutes. Afterwards, the mixture is homogenized at 200 bar and stored in a intermediate tank. Then vitamins and the required minerals are added, agitating intensively for at least 10 minutes. Afterwards, the complete batch is pasteurized at 85°-90° C. and spray dried as usual. The obtained powder is packaged directly or processed to an instant product.

The product is suitable as a dietetic food for the nutrition of patients suffering from gastrointestinal disorders.
Analysis:
100 ml ready to feed formula contain

| protein | | 1.0 g/100 ml |
|---|---|---|
| carbohydrates | | 8.5 g/100 ml |
| lactose | 7.5 g/100 ml | |
| starch | 1.0 g/100 ml | |
| fat | | 3.8 g/100 ml |
| butter fat | 1.5 g/100 ml | |
| vegetable fat | 2.3 g/100 ml | |
| minerals | | 0.2 g/100 ml |
| Na | 28 mg/100 ml | |
| K | 48 mg/100 ml | |

-continued

| Ca | 44 mg/100 ml |
|---|---|
| Mg | 3 mg/100 ml |
| P | 14 mg/100 ml |

We claim:

1. A process for producing bifidogenic infant and dietetic foods from a mammalian milk material containing one or both of milk protein and milk protein degradation products and selected from the group consisting of full-cream mammalian milk, skimmed mammalian milk, dietary proteins obtained from mammalian milk, and quarg comprising cleaving sialic acid by non-enzymatic means from said milk protein and/or said milk protein degradation products until a bifidogenic mammalian milk material is obtained, while retaining said cleaved sialic acid in said mammalian milk material.

2. A process according to claim 1 comprising heating the mammalian milk material with hydrochloric acid, or a mixture of hydrochloric acid and phosphoric acid, or a mixture of hydrochloric acid and citric acid, or a mixture of hydrochloric acid, phosphoric acid and citric acid within a pH range of 1-3 under sufficient conditions of pressure and temperature at which hydrolytic cleavage of sialic acid from milk protein and/or milk protein degradation products occurs.

3. A process according to claim 2 wherein the acid hydrolysis is performed at a temperature of 40°-90° C. and at a pressure ranging from normal atmospheric pressure up to 5 bar.

4. A process according to claim 3 wherein the time required for the acid hydrolysis is 1-24 hours.

5. A process according to any one of claims 1 to 3 further comprising the step of neutralizing the sialic acid with a neutralizing agent selected from the group consisting of NaOH, KOH, $Na_2CO_3$, $K_2CO_3$, $Ca(OH)_2$, and mixtures thereof, after the complete cleavage of sialic acid with hydrochloric acid or a mixture of hydrochloric acid and phosphoric acid or a mixture of hydrochloric acid and citric acid or a mixture of hydrochloric acid, phosphoric acid and citric acid.

6. A process according to any one of claims 1 to 4 which further comprises adding to the bifidogenic mammalian milk material lactose or maltose which is used to increase said bifidogenic effect.

7. A process according to claim 1, further comprising the following steps:
a. adding diluted hydrochloric acid, or diluted hydrochloric acid and phosphoric acid, or diluted hydrochloric acid and citric acid, or diluted hydrochloric acid, phosphoric acid and citric acid to the said mammalian milk material to achieve a pH in the range of 1-3,
b. heating the mixture obtained in accordance with (a) to a temperature of 40°-90° C. under normal atmospheric pressure up to a pressure of 5 bar for a sufficient time period to cleave sialic acid from the milk proteins,
c. neutralizing the product obtained in accordance with (b), with a neutralizing agent selected from the group consisting of KOH, NaOH, $Na_2CO_3$, $K_2CO_3$, $Ca(OH)_2$, and mixtures thereof, whereby the required concentration of the added minerals in the final product is adjusted,
d. adding to the product components selected from the group consisting of fats, carbohydrates, minerals, trace elements, and vitamins, and e. mixing the product, obtained in accordance with (d) and spray drying the bifidogenic infant food or dietetic food.

8. A process according to claim 5 which further comprises adding to the bifidogenic mammalian milk material at least one carbohydrate material to increase said bifidogenic effect.

9. A process according to claim 1, further comprising the following steps:
   a. adding diluted hydrochloric acid, or diluted hydrochloric acid and phosphoric acid, or diluted hydrochloric acid and citric acid, or diluted hydrochloric acid, phosphoric acid and citric acid to said mammalian milk material to achieve a pH in the range of 1–3,
   b. heating the mixture obtained in accordance with (a) to a temperature of 40°–90° C. under normal atmospheric pressure up to a pressure of 5 bar for a sufficient time period to cleave sialic acid from the milk proteins,
   c. neutralizing the product, obtained in accordance with (b), with a neutralizing agent selected from the group consisting of KOH, NaOH, $Na_2CO_3$, $K_2CO_3$, $Ca(OH)_2$, and mixtures thereof, whereby the required concentration of the added minerals in the final product is adjusted,
   d. heating the product to a temperature of 80°–100° C. for a sufficient period of time,
   e. adding to the product components selected from the group consisting of fats, carbohydrates, minerals, trace elements and vitamins, and
   f. mixing the product obtained in accordance with (c) and spray drying the bifidogenic infant food or dietetic food.

10. A process according to claim 8 wherein said carbohydrate is selected from a group consisting of lactose, maltose and starch.

* * * * *